United States Patent
Masuyama et al.

(10) Patent No.: US 7,444,532 B2
(45) Date of Patent: Oct. 28, 2008

(54) SYSTEM AND METHOD FOR AUTONOMOUS POWER SEQUENCING

(75) Inventors: Jinsaku Masuyama, Round Rock, TX (US); Jeremey J. Pionke, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 533 days.

(21) Appl. No.: 10/005,936

(22) Filed: Dec. 3, 2001

(65) Prior Publication Data

US 2003/0105984 A1   Jun. 5, 2003

(51) Int. Cl.
*G06F 1/26* (2006.01)
(52) U.S. Cl. .......................... 713/330; 713/300
(58) Field of Classification Search ................. 713/300, 713/330
See application file for complete search history.

(56) References Cited

U.S. PATENT DOCUMENTS

| | | | | |
|---|---|---|---|---|
| 3,735,041 A | * | 5/1973 | Fujita | 348/836 |
| 4,635,195 A | * | 1/1987 | Jeppesen et al. | 713/300 |
| 4,736,116 A | | 4/1988 | Pavlak, Jr. et al. | 307/41 |
| 4,992,970 A | | 2/1991 | Igarashi | 364/900 |
| 5,251,320 A | * | 10/1993 | Kuzawinski et al. | 713/324 |
| 5,274,781 A | * | 12/1993 | Gibart | 710/16 |
| 5,450,073 A | | 9/1995 | Brown et al. | 340/825.07 |
| 5,522,042 A | * | 5/1996 | Fee et al. | 709/226 |
| 5,550,729 A | | 8/1996 | Wissell | 363/65 |
| 5,802,266 A | * | 9/1998 | Kanekawa et al. | 714/11 |
| 5,915,122 A | * | 6/1999 | Tsurumi | 713/330 |
| 5,948,075 A | * | 9/1999 | Osten | 710/8 |
| 6,026,089 A | * | 2/2000 | Benayoun et al. | 340/286.01 |
| 6,237,103 B1 | | 5/2001 | Lam et al. | 713/330 |
| 6,325,636 B1 | * | 12/2001 | Hipp et al. | 439/61 |

(Continued)

FOREIGN PATENT DOCUMENTS

EP    0430671    6/1991

(Continued)

OTHER PUBLICATIONS

Ando Akiro, "Electronic Equipment and Its Power Supply Control Method", Jul. 4, 2000, Japanese Publication 2000-102166.*

(Continued)

*Primary Examiner*—Tse Chen
(74) *Attorney, Agent, or Firm*—Baker Botts L.L.P.

(57) ABSTRACT

A system and method are provided for autonomous power sequencing in a computer system. The system and method includes at least one server module such as a server blade or a server brick. A midplane receives the server modules and provides a unique address for each server module based on the location of the server modules on the midplane. The server modules each include an address module having a timer, the address module operable to obtain the unique address from the midplane and calculate a start-up time for the associated server module based on the unique address for each server module. A power supply sequences power to the server modules based on the start-up times for the server modules. Therefore, the server modules power up in a sequence instead of simultaneously and without the aid of a central controller controlling the sequencing of the powering of the server modules.

24 Claims, 3 Drawing Sheets

U.S. PATENT DOCUMENTS

| | | | |
|---|---|---|---|
| 6,349,235 B1* | 2/2002 | Gibart et al. | 700/11 |
| 6,452,789 B1* | 9/2002 | Pallotti et al. | 361/683 |
| 6,459,589 B2* | 10/2002 | Manweiler et al. | 361/752 |
| 6,473,396 B1* | 10/2002 | Kumar | 370/220 |
| 6,564,278 B1* | 5/2003 | Olson | 710/301 |
| 6,567,272 B1* | 5/2003 | Merkin | 361/724 |
| 6,648,667 B2* | 11/2003 | Heidenreich et al. | 439/352 |
| 6,688,965 B1* | 2/2004 | Crippen et al. | 454/184 |
| 6,735,704 B1* | 5/2004 | Butka et al. | 713/300 |
| 6,766,222 B1* | 7/2004 | Duley | 700/286 |
| 2002/0194412 A1* | 12/2002 | Bottom | 710/302 |
| 2002/0198608 A1* | 12/2002 | Smith | 700/24 |
| 2005/0177755 A1* | 8/2005 | Fung | 713/300 |

FOREIGN PATENT DOCUMENTS

GB    2122776    1/1984

OTHER PUBLICATIONS

U.S. Appl. No. 09/955,683 entitled "System and Method for Strategic Power Supply Sequencing in a Computer System" filed by Clint H. O'Connor et al. and assigned to Dell Products L.P.

* cited by examiner

SYSTEM AND METHOD FOR AUTONOMOUS POWER SEQUENCING

TECHNICAL FIELD

This disclosure relates in general to the field of computer power consumption, and more particularly to a system and method of autonomous power sequencing.

BACKGROUND

Computer systems, including servers and storage subsystems, use significant amounts of power. As computing requirements and the associated power requirements continue to increase, users are looking for ways to pack more computing power into smaller spaces while at the same time saving money and conserving energy. For example, companies are migrating towards high density server applications or modular computer systems, such as server blades and server bricks, instead of conventional U-sized servers (a U is a standard unit of measure for designating the height in computer enclosures and rack cabinets where 1U equals 1.75 inches). The most compact conventional U-sized servers are 1U high and typically hold two processors meaning that a maximum of 42 servers with 84 processors can fit in a standard 42U server rack cabinet. With the high density servers such as server blades, a standard 42U server rack cabinet can generally hold up to 252 servers with 252 processors where each server typically has one processor but may have more than one processor.

Increasing the number of servers within a server rack cabinet requires large power supplies able to supply power to the servers. Because the initial powering of a server produces a large current spike or inrush current before the server settles down to steady-state operation, a power supply must be able to satisfy the steady-state load as well the larger inrush load. To decrease the number of power supplies in high density server applications, multiple servers typically share a common power supply. Therefore, the inrush current load for a common power supply increases by a factor of how many servers are powered by the common power supply. In order to not fail when the servers power up, the common power supply must be powerful enough to satisfy the combined inrush load of all the servers associated with the common power supply. Because the common power supply must be built to handle the combined inrush load of the servers to prevent a failure, the common power supply is overbuilt for the steady-state operation of the servers. This results in a costly and overbuilt power supply that while adequate to handle the inrush load is overbuilt for steady-state operation which is where the common power supply typically operates. Therefore, the power supply operates inefficiently during steady-state operation.

One way to avoid an overbuilt power supply is to employ a central controller that controls and sequences the powering of the servers in a high density server application. One approach utilizing a central controller involves the use of jumpers on the CPU board of the servers so that the central controller can distinguish between the servers. By being able to distinguish between the servers, the central controller powers the servers one at a time thereby reducing the total inrush load. Instead of having a large inrush load by powering the servers simultaneously, the central controller powers the servers one at a time so that the common power supply only has to satisfy the inrush load for one server. Once a server has powered up and settled into steady-state operation, the central controller powers the next server, repeating the process until all the servers are powered. Therefore, the common power supply generally does not have to handle the combined inrush load for all the servers associated with it and only has to handle the inrush load for one server and the combined steady-state load for all the servers associated with it. Thus, the power supply is not overbuilt to satisfy the combined inrush load and therefore not as costly. But the central controller is an added cost and creates a single point of failure for the high density server application. If the central controller experiences a failure, then the common power supply may experience a power spike due to combined inrush load of all the servers since there is no central controller to sequence power and the common power supply is not designed to handle the combined inrush loads. Or the servers may not power up due to there being no central controller to sequence power to the servers.

SUMMARY

Therefore, a need has arisen for a system and method that allows for the powering of server applications using a power supply that satisfies inrush loads but is not costly and overbuilt for steady-state operation.

A further need has arisen for a system and method that allows for autonomous power sequencing in a computer system without the use of a central controller.

In accordance with teachings of the present disclosure, a system and method are described for autonomous power sequencing in a computer system which substantially eliminates or reduces disadvantages and problems associated with previous computer systems. The system and method allows for autonomous power sequencing in multiple server systems without the need for a central controller and overbuilt power supplies.

In accordance with one aspect of the present disclosure, a system and method provides autonomous power sequencing for a computer system having one or more server modules. The computer system may also include a midplane that receives the server modules and provides a unique address for each server module based on the location of the server modules on the midplane. One or more address modules, associated with the server modules, obtain from the midplane the unique addresses for the server modules and calculate a start-up time for each server module based on the unique address for each server module. One or more power supplies sequence power to the server modules based on the start-up times for each of the server modules.

In one embodiment, coupled to the midplane are one or more connectors and one or more resistors. The connectors provide an interface between the server modules, the midplane, and the power supply. Each server module interfaces with one connector. The resistors provide the unique addresses for the connectors and the server modules interfaced with the connectors through resistor strapping. When a user installs the server modules into the connectors on the midplane, the address modules obtain the unique addresses from the resistors on the midplane. The address modules use the unique address and calculate a start-up time utilizing a multiplication factor for the server module. Since each server module has an address module, each address module calculates a start-up time for the server module for which the address module is associated with. Each address module also includes a timer whereby the address module sets the timer with the start-up time. The timer counts down from the start-up time and on the expiration of the start-up time, the address module switches a switch on the server module to an on position allowing the server module to receive power from the power supply. Therefore, the server modules power up in a sequence independent of a central controller and any user involvement regarding the start-up.

In an alternative embodiment, the system and method may also include a management controller. The management controller provides sequence redundancy features for the computer system. For instance, if the midplane experiences a failure or the address modules can not obtain the unique addresses from the midplane, the management controller may provide the sequencing of power to the server modules based on a sequence within the management controller. Therefore, the server modules power up in a sequence and the power supply does not experience an unacceptably large inrush load from the powering of the server modules.

The present disclosure provides a number of important technical advantages. One important technical advantage is ability to sequence and provide power to the server modules without a costly and overbuilt power supply. Because the server modules power up in sequence instead of powering simultaneously, the power supply does not have to satisfy the combined inrush load for all the server modules powered by the power supply. Since the server modules power up in a sequence, the power supply only has to be large enough to provide enough current for one inrush load. For example, when a server module powers up, the power supply supplies the inrush current required to power the server module. After the server modules powers up, it will settle down to the lower steady-state power requirement. Once the server module settles to steady-state, the next server module powers up and the power supply provides enough current for the steady-state operation for the already powered server module and the inrush current for the server module that is powering. Because the power supply does not have to supply the combined inrush current for the server modules, the power supply does not have to be overbuilt with respect to the steady-state operation. Therefore, the power supply is less costly because it is not built to provide the combined inrush current. The power supply is not overbuilt for steady-state operation and therefore the peak operating performance of the power supply may be lowered allowing for a more cost efficient power supply.

Another important technical advantage of the present disclosure is the ability to sequence power to the server modules without the use of a central controller. The sequencing of power to the server modules is autonomous in that the server modules power up in a sequence independent of any user involvement or central controller. In previous computer systems, the use of a central controller to sequence powering has resulted in a single point of failure. But the unique addresses and the midplane allow for the sequencing of the powering of the server modules without a central controller and therefore eliminate the single point of failure with a central controller. Because the midplane contains only passive components and provides sequencing without any active control circuits which generally have a higher failure rate, the midplane is fault tolerant. Because the midplane is a passive component, the midplane is inexpensive compared to a central controller and therefore a cost savings to the users. Since the midplane assigns the unique address for each server module instead of a central controller using jumpers or other means to distinguish between server modules for power sequencing, there is no need for a user to manually assign an address to each server module and typically no chance of a power sequencing error due to the user changing the positions of the server modules within the computer system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

Under previous systems and methods for powering computer systems including multiple servers, the power supply has been costly and overbuilt with respect to steady-state operation to satisfy the inrush loads created when simultaneously powering on the multiple server modules. To avoid an overbuilt power supply, the server applications have employed central controllers to sequence the powering of the server modules. But central controllers are expensive and create a single point of failure for the server modules. The present disclosure allows for autonomous power sequencing of server modules without the use of a central controller resulting in a properly sized power supply.

Figure 1:
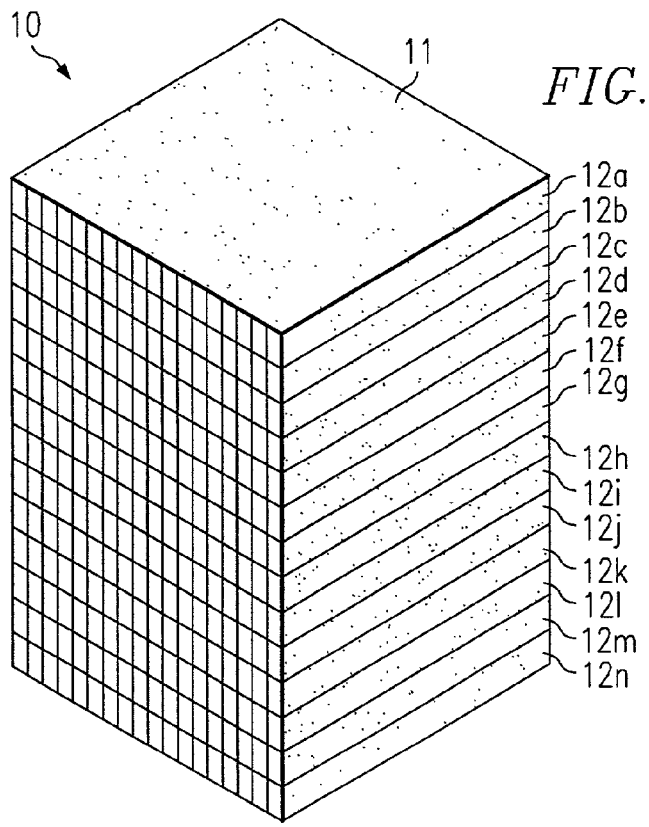
FIG. 1 is a schematic representation of a high density server application.

FIG. 1 is a schematic representation of high density server application 10 enclosed within cabinet 11. Cabinet 11 accepts one or more chassis 12 where chassis 12 receive one or more high density server modules. Cabinet 11 may be a typical U-sized server rack cabinet. In the embodiment shown in FIG. 1, cabinet 11 may be a 42U server rack cabinet meaning that it can accommodate forty-two conventional 1U server systems or any combination of conventional 1U, 2U, 4U, and 7U server systems equaling 42U.

Cabinet 11 accepts server modules, such as high density server modules, instead of conventional U-shaped server systems. The server modules, such as server blades and server bricks, install within chassis 12 which also house shared network connections, power supplies, and cooling systems. A server blade is a thin, ultra-dense, modular electronic circuit board containing one or more processors and memory that consumes low amounts of power. A server brick is a larger-sized rack-mounted modular device that offers extra storage, memory, and processing power and is generally enclosed within a casing. Therefore, cabinet 11 receives one or more chassis 12 where chassis 12 house the server modules. In the embodiment shown in FIG. 1, there are fourteen chassis 12a-12n where each chassis 12 is 3U high and each chassis 12 fits more computing power than a conventional U-sized rack-mounted server system. Chassis 12 are rack optimized and designed to fit within any industry standard server rack cabinets. Through a simple rail mount, chassis 12 allows for installation into any four-post server rack cabinet. In other embodiments there may be more or less than fourteen chassis 12 in cabinet 11 and chassis 12 may be greater than or less than 3U in height. A typical implementation of high density server application 10 within cabinet 11 may include only server blades, only server bricks, or a combination of server blades and server bricks.

Figure 2:
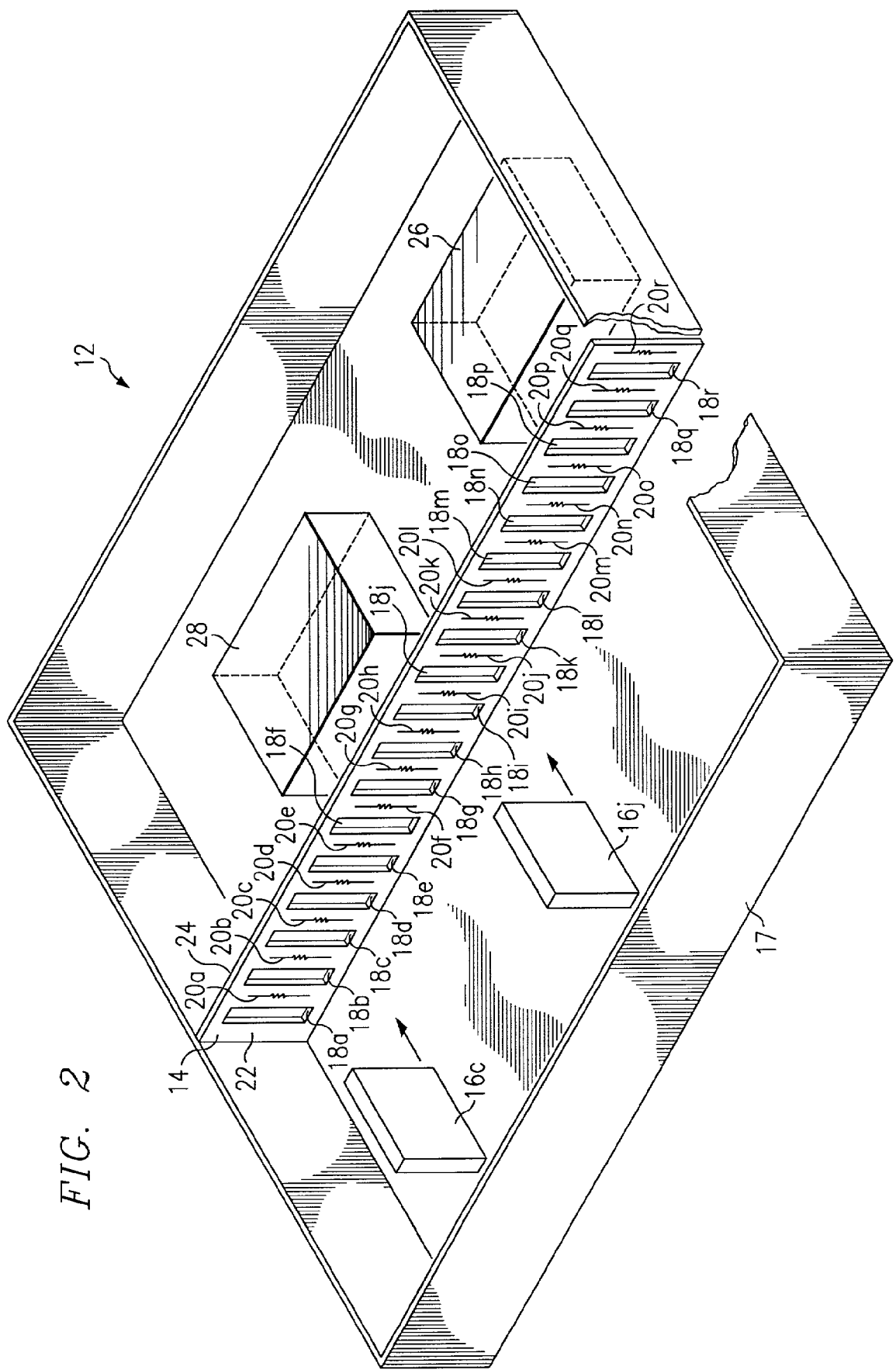
FIG. 2 illustrates a typical chassis for high density server modules.

Shown in FIG. 2 is an example chassis 12 removed from cabinet 11 where chassis 12 is operable to receive server modules such as server blades 16. Although chassis 12 is shown in FIG. 2 to receive server blades 16, chassis 12 may also be configured to receive server modules such as server bricks. Chassis 12 provides a housing for server blades 16 and power for server blades 16. Chassis 12 is an easy to service modular enclosure that may hold up to eighteen server blades 16. In alternate embodiments, chassis 12 may hold more or less than eighteen server blades 16. System administrators may easily increase the processor density of chassis 12 by adding additional server modules to chassis 12.

Chassis 12 includes midplane 14 operable to receive the server modules such as server blades 16. Each chassis 12 has a midplane 14. Midplane 14 may be a circuit board having passive components and contains such components as connectors 18 and resistors 20. In alternate embodiments, midplane 14 may include passive components as well as active components such as integrated circuits or logic circuits. When midplane 14 includes passive components rather than active components, midplane 14 is less likely to experience a failure since typically passive components are more fault tolerant than active components. When midplane 14 contains connectors 18 and resistors 20 and no active circuits, midplane 14 has increased fault tolerance and is typically inexpensive to manufacture due to uncomplicated design.

Midplane 14 may include connections on both front side 22 and back side 24. Front side 22 includes eighteen connectors 18a-18r. In alternative embodiments, midplane 14 may include more or less than eighteen connectors 18 on front side 22. Connectors 18 provide an interface between server blades 16 and midplane 14 where each connector 18 accepts one server blade 16. Connectors 18 allow midplane 14 and chassis 12 to accept up to eighteen server blades 16 in the embodiment shown in FIG. 2. Midplane 14 does not require all eighteen connectors 18 to have a server blade 16 installed for proper functionality—one server blade 16 installed in one connector 18 is sufficient for proper functionality of both midplane 14 and server blade 16.

Front side 22 also includes one or more resistors 20 coupled adjacent connectors 18 where resistors 20 are associated with particular connectors 18. For example, resistor 20a is associated with connector 18a while resistor 20k is associated with connector 18k. Although FIG. 2 shows one resistor 20 associated with each connector 18, in alternate embodiments there may be more than one resistor 20 associated with a particular connector 18. For instance, connector 20b may have five resistors 20b associated with it while five resistors 20p are associated with connector 18p.

A user inserts server blades 16 into chassis 12 through front door 17 of chassis 12. Front door 17 may swivel open to allow a user to install or remove server blades 16 from chassis 12. In addition, front door 17 may also include a lock to keep unwanted users from installing, removing, or swapping server blades 16. To install a server blade 16 within chassis 12, the user opens front door 17 and determines which connector 18 on midplane 14 to install server blade 16. The user is not limited to which connector the user may install server blade 16 and in fact the user has the ability to install a server blade 16 into any of connectors 18. For example, if the user wants to install server blade 16c into connector 18c, the user opens front door 17 and slides server blade 16c into chassis 12 until server blade 16c is installed within connector 18c.

Back side 24 of midplane 14 also includes connections (not expressly shown) for power supply 26 and management controller 28. Power supply 26 provides power for midplane 14, server blades 16, and management controller 28. Each chassis 12 typically has its own power supply 26 and power supplies are not generally shared between the different chassis 12. Power supply 26 is of the appropriate power rating to provide load-balancing for server blades 16. Power supply 26 provides sufficient power to satisfy the steady-state load requirements of eighteen server blades 16 operating simultaneously but does not provide sufficient power to satisfy the inrush load requirement of eighteen server blades 16 powering on simultaneously. But power supply 26 does not have to satisfy the simultaneous inrush load of eighteen server blades 16 powering on because server blades 16 power on not all at one time but in a sequence through autonomous power sequencing. Power supply 26 may be designed to use local on-card regulation or also provide power on a shared bus beyond the requirement of the on-card resources. In alternate embodiments, there may be more than one power supply 26 to provide additional functionality such as power supply redundancy.

In alternate embodiments, midplane 14 may accept server blades 16, power supply 26, and management controller 28 on either front side 22 or back side 24. Accepting server modules 16 and power supply 26 on either front side 22 or back side 24 of midplane 14 allows for flexible modular chassis 12 designs since midplane 14 may accept server blades 16 and power supply 26 on both sides of midplane 14.

Figure 3:
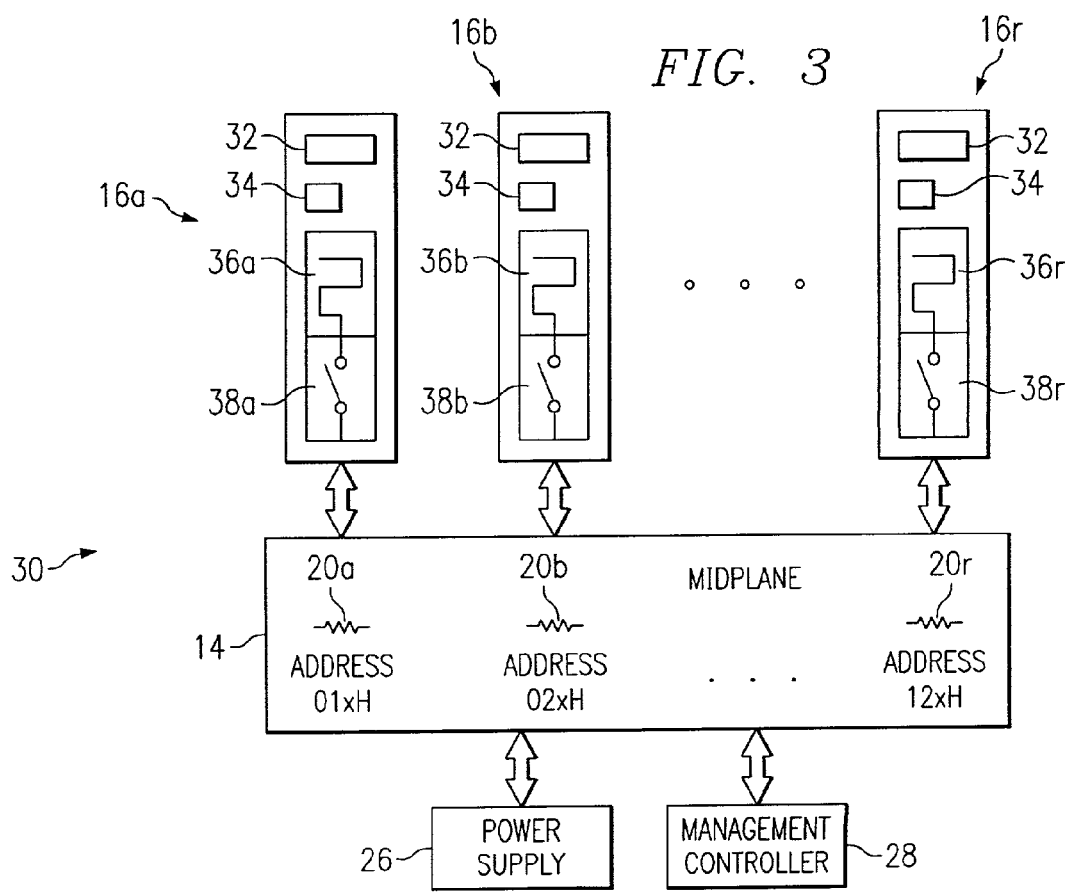
FIG. 3 depicts a block diagram of server modules employing autonomous power sequencing.

FIG. 3 depicts a block diagram of server modules within chassis 12 employing autonomous power sequencing. System 30 sequences the powering of server modules and is shown in FIG. 3 with server blades 16. System 30 may also sequence the powering of server bricks or any other suitable modular server topologies within cabinet 11.

Server blades 16 allow for the power of conventional U-shaped servers on compact electronic circuit board units, which consume less power than conventional U-shaped servers and allow for higher processor density per chassis 12 and cabinet 11. Each server blade 16 is an independent server unto itself that can act independently of the other server blades 16. Connectors 18 utilize a high-speed bus to connect server blades 16 to midplane 14, power supply 26, and management controller 28. Server blades 16 maintain fast and fault tolerant communications at high speeds with each other, power supply 26, and management controller 28 via midplane 14.

Server blades 16 are complete computing systems that include processor 32 (such as those processors manufactured by Intel or Advanced Micro Devices) and memory 34 as well as storage and network functionality on a single circuit board. Although the embodiment in FIG. 3 shows server blades 16 having one processor 32, server blades 16 may have more than one processor 32 in alternate embodiments.

As described above with respect to FIG. 2, each connector 18 on midplane 14 may receive one server blade 16. For example, a user may install server blade 16a into connector 18a, server blade 16b into connector 18b, and server blade 16r into connector 18r. The user does not need to install server blades 16 into all the available connectors 18 for system 30 to function properly. System 30 functions properly whether only one server blade 16 is installed, if all server blades 16 are installed, if only a portion of server blades 16 are installed and some connectors 18 are skipped, or if all server blades 16 are installed but some are not functioning.

Each connector 18 on midplane 14 has a unique address associated with it. The unique address for each connector 18 is provided through resistor strapping using resistors 20. Midplane 14 employs resistor strapping using resistors 20 to assign a unique address to each connector 18. As described above, connectors 18 may have more than one resistor 20 associated with them. For example, associated with each connector 18 may be five identical resistors 20 so that connector 18a has five identical resistors 20a, connector 18b has five identical resistors 20b, and connector 18r has five identical resistors 20r. The five resistors 20 for each connector 18 are coupled to each connector 18 in a particular order in five positions so that each connector 18 has five resistors 20 that are arranged in a particular order. To assign a unique address for connector 18a, resistor 20a in the first position is attached to a voltage charge, which may be a +5V, +3.3V, +12V, or any other appropriate voltage charge including negative voltage levels. The remaining four resistors 20a are grounded. This arrangement of the five resistors 20a allows for a particular binary address based on which resistors 20a receive a charge and which are grounded. For connector 18b, five resistors 20b may also be used to create a unique address. In order to create a unique address for connector 18b different from connector 18a, resistor 20b in the second position is attached to a five volt charge while resistors 20b in the first, third, fourth, and fifth positions are grounded. In alternate embodiments where midplane 14 accepts more than eighteen server blades 16, more than five resistors 20 per connectors 18 may be required to provide a sufficient number of unique addresses.

The process of attaching certain resistors 20 to a charge and the remaining resistors 20 to a ground allows for a unique address for each connector 18. Numerous combinations are available for which resistors are grounded and which are connected to a charge allowing for numerous unique addresses. For example with connector 18r, resistors 20r in the first and second positions may be attached to a five volt charge while resistors 20r in the third, fourth, and fifth positions are grounded. In alternate embodiments, more or less than five resistors 20 may be used per connector 18 to provide the unique addresses and different charges besides five volts and grounding may be used. Resistor strapping allows for scalable unique addresses that allows for the addition of additional connectors 18 so that chassis 12 may accept additional server blades 16 if midplane 14 is altered to accept more server blades 16.

In addition to the unique address determined through resistor strapping, each connector 18 also has a location address based on the location of connectors 18 on midplane 14. For example, connector 18a is on one end of midplane 14 and has the location address of 01xH. Connector 18b is located next to connector 18a and has the location address 02xH. Connector 18r is located on the opposite end of midplane 14 from connector 18a and has the location address of 12xH. The location addresses correlate to the hexadecimal value of the midplane resistor strapping. Server blades 16 utilize the multiplication factor to help calculate a start-up time for server blades 16 where the value of the multiplication factor relates to the start-up characteristics of server blades 16 such as the inrush load requirement and how quickly server blades 16 settle down to steady-state and the characteristics of power supply 26.

In addition to processor 32 and memory 34, server blades 16 also include address module 36 and switch 38. Each server blade 16 has its own address module 36 and switch 38. Address module 36 may be an integrated circuit such as a complex programmable logic device and switch 38 may be an electronic switch or any other appropriate switch. Address modules 36 obtain the unique addresses from connectors 18 and calculate a start-up time for server blades 16. For example, when the user installs server blade 16a into connector 18a, address module 36a obtains the unique address for connector 18a and determines that server blade 16a is installed in connector 18a and that the location address for connector 18a is 01xH. Once address module 36a acquires the location address for connector 18a with which server blade 16a is installed, address module 36a locates the multiplication factor.

The multiplication factor may be any number but typically may be two, five, or ten. The value of multiplication factor depends on various factors such as the inrush load requirement for server blades 16 and the amount of time it takes for each server blade 16 to settle into steady-state operation. For example, if server blades 16 require four seconds to settle down from power up inrush loads to steady-state, then a multiplication factor of five may be appropriate to allow each server blade 16 ample time to settle down to steady-state after power up to allow power supply 26 to satisfy the inrush load requirements of server blades 16 one at time. For instance, with a multiplication factor of five, server blade 16a starts up at five seconds, server blade 16b starts up at ten seconds, and server blade 16r starts up at ninety seconds after the user turns on system 30.

Address module 36a calculates the start-up time for server blade 16a by multiplying the multiplication factor by the location address. If the multiplication factor is two, then address module 36a multiplies two by 01xH to arrive at a start-up time of two seconds after the user turns on system 30. For server blade 16b installed in connector 18b, the start-up time is four seconds (2*2=4, where one 2 is the multiplication factor and the other 2 is taken from 02xH) and for server blade 16r in connector 18r, the start-up time is thirty-six seconds (2*18=36, where 2 is the multiplication factor and 18 is taken from 12xH where 12xH corresponds to 18 in a base 10 number system). Therefore each server blade 16 within system 30 has a different start-up time based on which connector 18 the server blade 16 is installed. With a multiplication factor of two, each server blade 16 would power up two seconds after the previous server blade 16 powered up. In alternate embodiments, the unique addresses may be associated with a lookup table where each unique address corresponds to a predetermined startup time. Address modules 36 would determine the start-up time for the associated server blades 16 by looking up the start-up time corresponding to the unique address. Using the lookup table would allow for a non-linear power up delay sequence.

Figure 4:
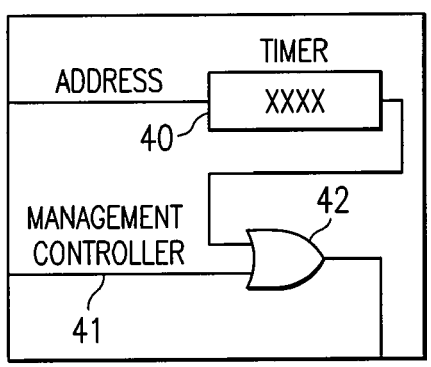
FIG. 4 illustrates a block diagram of a typical address module for a server module.

FIG. 4 depicts a typical address module 36 in greater detail. Associated with each address module 36 is timer 40. Once address module 36 calculates the start-up time for server blade 16, address module 36 sets timer 40 with the start-up time and starts timer 40 counting down to zero from the start-up time when the user turns on system 30. When timer 40 reaches zero, address module 36 switches switch 38 from an off position to an on position allowing server blade 16 to receive power from power supply 26.

For example, with a multiplication factor of two, address module 36a calculates a start-up time of two seconds for server blade 16a, address module 36b calculates a start-up of four seconds for server blade 16b, and address module 36r calculates a start-up time of thirty-six seconds for server blade 16r. Address module 36a sets timer 40a with a start-up time of two seconds, address module 36b sets timer 40b with a start-up time four seconds, and address module 36r sets timer 40r with a start-up time of thirty-six seconds. Address modules 36 start their respective timers 40 at the same time and timers 40 begin counting down to zero from their respective start-up times. After two seconds, timer 40a reaches zero, address module 36a switches switch 38a to the on position from the off position allowing server blade 16a to receive power from power supply 26 and power up. After four seconds, timer 40b reaches zero and address module 36b switches switch 38b from the off position to the on position allowing server blade 16b to receive power from power supply 26 and power up. After thirty-six seconds, timer 40r reaches zero and address module 36r switches switch 38r from the off position to the on position allowing server blade 16r to receive power from power supply 26 and power up. The fact that not all server blades 16 are installed on midplane 14 does not affect the sequence powering of server blades 16a, 16b, and 16r which are installed on midplane 14.

Since each server blade 16 is receiving power from power supply 26 at different times, server blades 16 power up in a particular timed sequence depending on the value of the multiplication factor, such sequenced powering independent of control by a central controller. Because of the sequence powering of server blades 16, power supply 26 typically does not have to satisfy the inrush load requirements of more than one server blade 16 at a time and therefore does not have to be overbuilt from a steady-state perspective to satisfy a combined inrush load requirement.

Address modules 36 obtaining the unique addresses of connectors 18 allows for the sequencing of the powering of server blades 16 without the use of a central controller. But in alternate embodiments, management controller 28 may be included within chassis 12 and system 30 and utilized to provide sequence redundancy for instance when midplane 14 or server blades 16 experience a failure and autonomous power sequencing is not able to occur. Stored within management controller 28 is a start-up sequence for server blades 16 taking into account the characteristics of power supply 26 and server blades 16. The start-up sequence may be the same startup sequence as determined by address modules 36 using the unique addresses and the multiplication factor or the startup sequence may be user selectable through management controller software. The start-up sequence being user selectable would allow a user to override the autonomous sequencing and allow server blades 16 to power up in a different sequence, as long as the power up sequence does not violate minimum inrush current specifications.

Address module 36 includes gate 42, which may be a logical OR gate, that allows either management controller 28 or the autonomous sequencing through the unique addresses to power up server blades 16 in a sequence. Management controller 28 controls the powering of server blades 16 when there is a failure with server blades 16 or midplane 14. When such a failure occurs, server blades 16 may not be able to autonomously power up in sequence based on the location of server blades 16 on midplane 14. Therefore, management controller 28 powers up server blades 16 in a pre-determined sequence using a timer internal to management controller 28. As the internal timer expires, management controller 28 transmits a signal along path 41 within address modules 36 for each server blade 16 signaling the powering of each server blade 16.

The presence of management controller 28 reduces downtime when there is an error or failure with server blades 16 or midplane 14 because server blades 16 may still be powered in a sequence controlled by management controller 28. The user may still use high density server application 10 without over burdening power supply 26 and high density server application 10 remains functional while the user waits for the repair of the component experiencing the malfunction.

Utilizing resistors 20 to assign unique addresses to connectors 18 instead of assigning a unique address to each server blade 16 allows for better interoperation of server blades 16. Previous computer systems may assign a unique address to each server blade 16 itself using jumpers or dip switches. Locating the unique address on server blades 16 creates a problem when the user installs two server blades 16 having the same address within chassis 12. Two server blades 16 having the same address results in two server blades 16 powering on at the same time defeating the benefit of sequencing the powering of server blades 16 because power supply 26 would have to satisfy the combined inrush load of two server blades 16 simultaneously. Power supply 26 may fail if it cannot satisfy the combined inrush load requirement of two server blades 16 powering simultaneously. In addition, if server blades 16 were to contain the unique addresses for the powering sequence, everything may function correctly until the user begins pulling out server blades 16 and reinstalling them in the same or different locations. If the user does not mark the location of each server blade 16 when removing it, when the user reinstalls server blades 16 the user may not install server blades 16 into the correct connectors 18 and therefore the powering sequence may be altered for server blades 16. In addition, having the unique address on midplane 14 instead of server blades 16 allows the unique address to stay the same and not move when the user moves server blades 16 among connectors 18.

Having the unique addresses on midplane 14 instead of server blades 16 also allows users to switch server blades 16 among the same chassis 12 or among different chassis 12 with the user not needing to fully understand the powering sequence. Because server blades 16 carry no address information, a user may switch server blade 16a installed in connector 18a with server blade 16r installed in connector 18r and the user does not have to remember anything about the previous location of server blades 16 nor perform any set up features. When the user switches server blades 18a and 18r, server blade 18a reads that it is located in connector 18r and server blade 18r reads that it is in connector 18a and therefore power up according to the new locations.

In addition, the user may also switch server blades 16 between different chassis 12 allowing the user to take server blade 16a from chassis 12a and install it in chassis 12j. Since server blade 16a carries no address information and determines its address from the connector 18 location that it is installed in, typically no problems arise from swapping server blades 16 between different chassis 12. The users may also add additional server blades 16 to chassis 12 without having to configure the added server blades 16 to power up in the correct sequence and without having to reconfigure server blades 16 already installed within chassis 12. Also, the fact that all server blades 16 do not power on or that some connectors 18 do not have server blades 16 installed does not affect the powering sequence of the installed server blades 16. Server blades 16 operate independently of each other and power up once the start-up time expires within timer 40 regardless of whether any preceding or succeeding server blades 16 power up.

Figure 5:
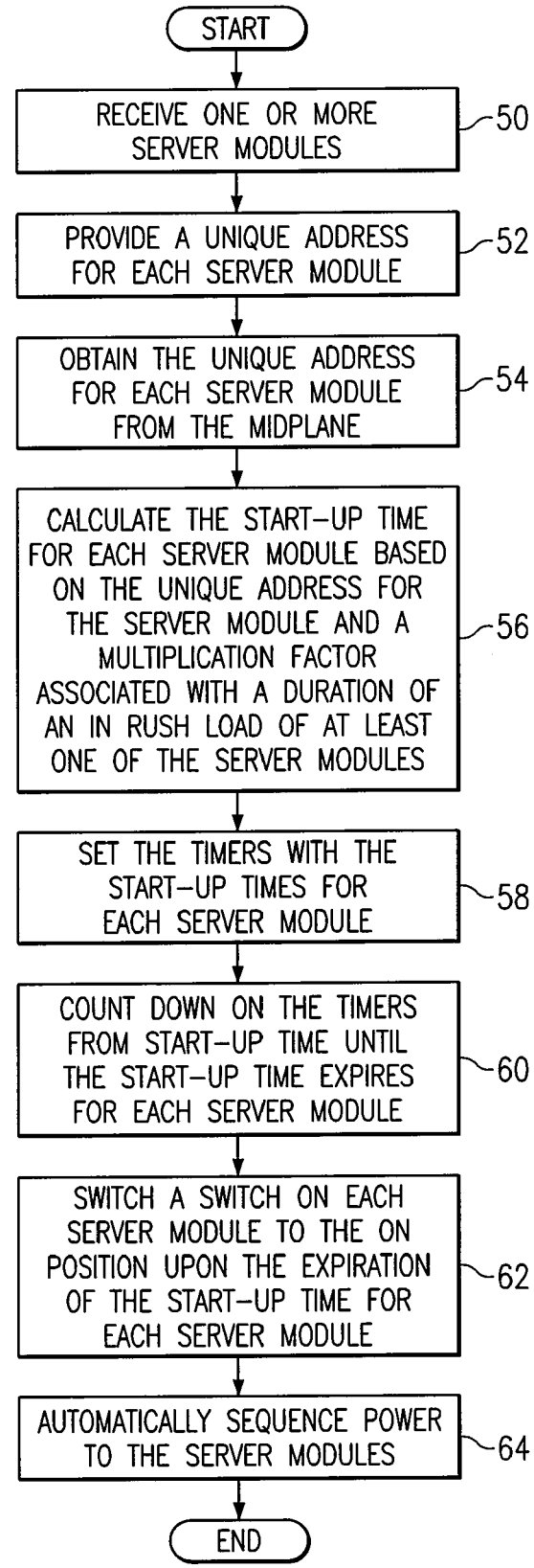
FIG. 5 depicts a flow diagram of a method for autonomous power sequencing.

FIG. 5 depicts a flow diagram of a method for autonomous power sequencing for computer systems. For discussion purposes, FIG. 5 refers to system 30 but equally applies to any configuration of server modules such as server blades or server bricks within chassis 12 within cabinet 11.

The process begins at step 50 when midplane 14 and connectors 18 receive one or more server blades 16. Midplane 14 and connectors 18 receive one or more server blades 16 when a user installs additional server blades 16 into connector 18 or swaps server blades 16 already installed within chassis 12. Once the user installs server blades 16 within connectors 18, at step 52 connectors 18 provide a unique address for each server blade 16 based on the location of each connector 18 on midplane 14 using resistor strapping as described above. At step 54, address modules 36 obtain the unique address for the connector 18 that the associated server blade 16 is installed in and determines the location address for the connector 18 for which the associated server blade 16 is installed.

After address modules 36 have obtained the unique addresses, at step 56 address module 36 calculates a start-up time for the server blade 16 that address module 36 is associated. Address module 36 calculates the start-up time by first determining the multiplication factor for the powering sequence as described above. Once address module 36 determines the multiplication factor, address module 36 calculates the start-up time by multiplying the multiplication factor by the location address for the connector 18 for which server blade 16 is installed. At step 58, address module 36 sets timer 40 with the start-up time. Each server blade 16 has a different start-up time based on the location of server blades 16 on midplane 14 so each timer 40 will be set with a different start-up time. Once address modules 36 set timers 40 with the respective start-up times, at step 60 timers 40 begin to count down to zero from the startup times.

As the start-up time on timers 40 begin to expire, at step 62 upon the expiration of the start-up time, address module 36 switches switch 38 to an on position from an off position allowing server blade 16 to receive power from power supply 26. As each successive timer 40 expires, the associated address module 36 switches switch 38 to allow each server blade 16 to receive sequenced power in a sequence determined by the start-up times at step 64. Because each server blade 16 has a different start-up time and each server blade 16 receives power from power supply 26 upon the expiration of its start-up time, server blades 16 do not power up simultaneously but power up in a sequence one after another so that power supply 26 does not have to satisfy the inrush load requirement of more than one server blade 16 at the same time. When there is not a malfunction that requires the user of management controller 28, server blades 16 autonomously power up in a sequence determined by server blades' 16 location on midplane 14.

Although the disclosed embodiments have been described in detail, it should be understood that various changes, substitutions and alterations can be made to the embodiments without departing from their spirit and scope.

What is claimed is:

1. A computer system comprising: a power supply; a plurality of server modules; a midplane comprising: a plurality of connectors receiving the plurality of server modules, each connector having a unique predetermined address independent of the plurality of server modules; and an address module obtaining the unique predetermined addresses of the plurality of connectors from the midplane and to calculate a start-up time associated with each connector based on (a) the unique predetermined address for each connector and (b) a multiplication factor associated with a duration of an inrush load of at least one of the plurality of server modules, the start-up times calculated for the plurality of connectors defining a start-up sequence for the plurality of connectors; wherein the computer system couples the power supply to the plurality of server modules based on the start-up times and the defined start-up sequence associated with the plurality of connectors; and a management controller associated with the midplane, the management controller storing the defined start-up sequence for the plurality of server modules and the management controller providing sequence redundancy by sequencing power to the plurality of server modules during start-up if the midplane experiences a failure.

2. The system of claim 1 wherein the plurality of server modules comprise blade servers.

3. The system of claim 1 wherein the plurality of server modules comprise brick servers.

4. The system of claim 1 wherein the midplane further comprises a circuit board including the plurality of connectors coupled to the midplane and two or more resistors coupled to the midplane.

5. The system of claim 4 wherein the plurality of connectors provide an interface between the plurality of server modules and the midplane.

6. The system of claim 4 wherein each connector interfaces with one server module.

7. The system of claim 4 wherein the midplane provides a unique address to each server module through resistor strapping the two or more resistors.

8. The system of claim 1 wherein the midplane further provides an interface between the plurality of server modules and the power supply.

9. The system of claim 1 wherein the power supply provides power to each server module upon expiration of an associated start-up time for each server module.

10. The system of claim 1 wherein the address module includes a timer, the address module further sets the timer with an associated start-up time and the timer counts down from the associated start-up time.

11. The system of claim 1 further comprising a switch associated with each server module and the address module, the switch accepts a command from the address module to switch between an on position and an off position.

12. The system of claim 11 wherein at an expiration of an associated start-up time, the address module switches a selected switch to the on position allowing an associated server module to receive power from the power supply.

13. A method for autonomous power sequencing in a computer system, the method comprising: receiving a plurality of server modules into a plurality of connectors on a midplane, each connector having a predetermined address independent of the plurality of server modules; assigning a unique address to each server module based on the predetermined address of each connector receiving each server module; obtaining the unique address for each server module from the midplane; calculating a start-up time associated with each connector based on (a) the unique address for each connector and (b) an inrush load requirement of each server module; automatically sequencing power to start up the plurality of server modules based on the start-up times for the plurality of connectors; and storing a start-up sequence for the plurality of server modules and providing redundancy by sequencing power to the plurality of server modules during start-up if the midplane experiences a failure.

14. The method of claim 13 wherein the server modules comprise blade servers.

15. The method of claim 13 wherein the server modules comprise brick servers.

16. The method of claim 13 wherein calculating the start-up time comprises:
   obtaining a multiplication factor for each server module; and
   calculating the start-up time associated with each connector using the multiplication factor.

17. The method of claim 13 further comprising: setting a timer with an associated start-up time; counting down the timer until the associated start-up time expires; and on an expiration of the associated start-up time, switching a switch to an on position that allows an associated server module to receive power from a power supply.

18. The method of claim 13 wherein receiving the server modules comprises inserting each server module into a connector coupled to the midplane.

19. The method of claim 13 wherein providing the unique address for each server module comprises strapping one or more resisters to the midplane whereby each connector has a unique predetermined address independent of the server modules.

20. The method of claim 13 wherein automatically sequencing power to the server modules comprises providing power to the server modules one server module at a time.

21. The method of claim 13 wherein automatically sequencing power to the server modules comprises providing power to each server module upon an expiration of an associated start-up time for each server module.

22. A computer system comprising: a plurality of server modules processing data; one or more midplanes associated with the plurality of server modules, the one or more midplanes including a plurality of connectors, each connector having a unique predetermined address independent of the plurality of server modules, each connector interfacing with one of the plurality of server modules; an address module associated with the one or more midplanes, the address module obtaining the unique predetermined addresses from the plurality of connectors and to calculate a start-up time associated with each connector based on (a) the unique address for each connector and (b) at least one start-up characteristic of each server module, the start-up times calculated for the plurality of connectors defining a start-up sequence for the plurality of connectors; a power supply associated with the one or more midplanes, the power supply providing power to start up the plurality of server modules in a sequence determined by the start-up times and the defined start-up sequence associated with the plurality of connectors; a management controller associated with a respective midplane, the management controller storing the defined start-up sequence for the plurality of server modules and the management controller providing sequence redundancy by sequencing power to the plurality of server modules during start-up if the respective midplane experiences a failure; and one or more chassis housing the plurality of server modules, the one or more midplanes, and the power supply.

23. The computer system of claim 22 further comprising one or more cabinets housing the one or more chassis.

24. An information handling system comprising: a power supply; a plurality of server modules; a midplane comprising: a plurality of connectors receiving the plurality of server modules, each connector having a unique predetermined address independent of the plurality of server modules; and an address module obtaining the unique predetermined addresses of the plurality of connectors from the midplane and to associate each unique predetermined address of the plurality of connectors with a predetermined start-up time stored by the address module, the predetermined start-up times for the plurality of connectors defining a start-up sequence for the plurality of connectors; and wherein the information handling system couples the power supply to the plurality of server modules based on the predetermined start-up times and the defined start-up sequence associated with the plurality of connectors; and a management controller associated with the midplane, the management controller storing the defined start-up sequence for the plurality of server modules and the management controller providing sequence redundancy by sequencing power to the plurality of server modules during start-up if the midplane experiences a failure.

* * * * *